No. 868,447. PATENTED OCT. 15, 1907.
J. A. JUST.
EVAPORATING PROCESS.
APPLICATION FILED NOV. 24, 1906.

Attest:

Inventor:
JOHN A. JUST
by Dickerson, Brown, Raegener & Binney Attys.

UNITED STATES PATENT OFFICE.

JOHN A. JUST, OF SYRACUSE, NEW YORK.

EVAPORATING PROCESS.

No. 868,447.     Specification of Letters Patent.     Patented Oct. 15, 1907.

Application filed November 24, 1906. Serial No. 344,896.

*To all whom it may concern:*

Be it known that I, JOHN A. JUST, a citizen of the United States, and a resident of Syracuse, New York, have invented certain new and useful Improvements in Evaporating Processes, of which the following is a specification, accompanied by drawings.

This invention relates to the process of evaporating milk or other suitable material from which it is desired to dry out the moisture, and the object of the process is to enable the material to be more quickly and efficiently dried than heretofore.

Further objects of the invention will hereinafter appear and to these ends the invention consists of a drying process hereinafter more fully described and claimed in this specification and illustrated by means of the accompanying drawings, in which,—

Figure 1:
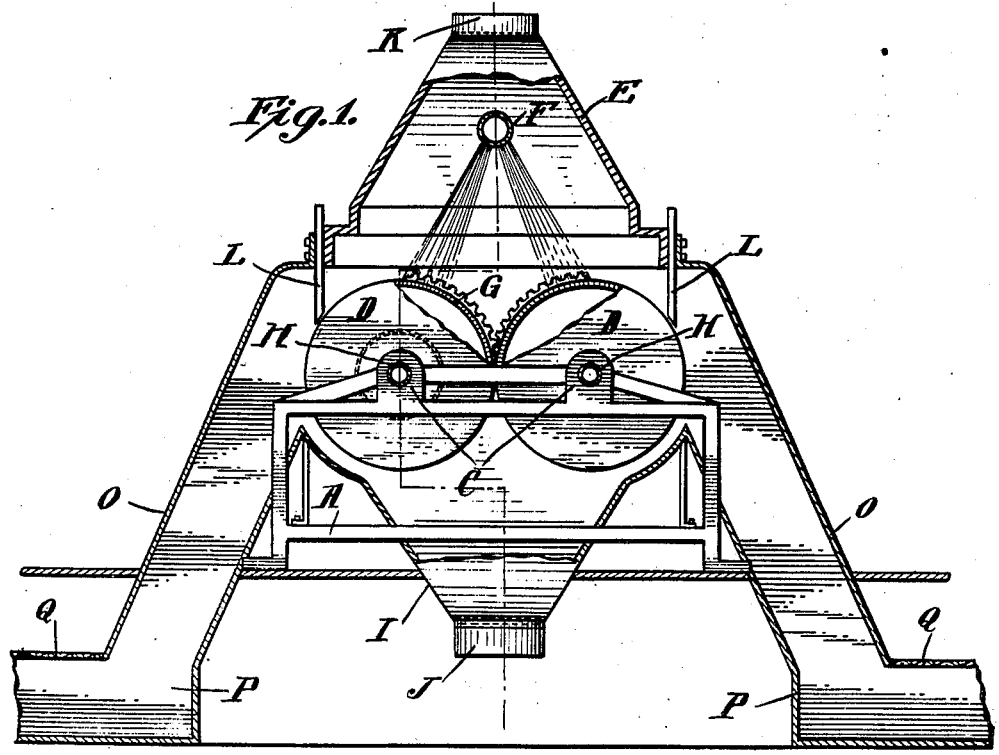
Figure 2:
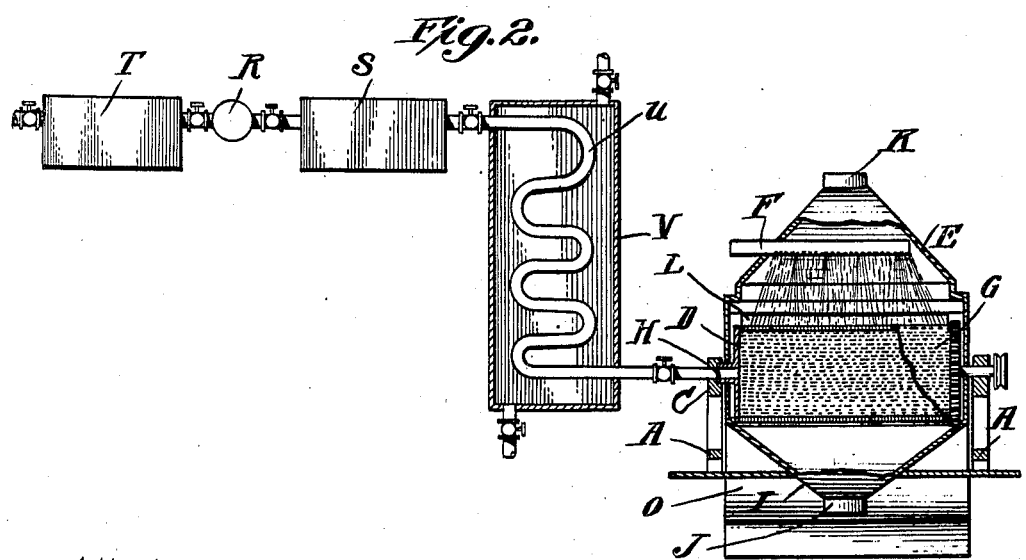

Figure 1 is an end elevation of apparatus embodying the invention, partly in section; Fig. 2 is a side elevation thereof partly in section.

Referring to the drawings, A represents the frame of the machine, provided with bearings C for the drying rolls D, which are adapted to be rotated in any suitable manner in the same direction or towards each other. Above the rolls is provided a hood E and a perforated supply pipe F for the material to be dried, which is sprayed on to the rollers, preferably on the inner quarters thereof, in such manner as to distribute it evenly over the surface. These rollers are preferably constructed with both ends closed, and the peripheries or surfaces of the rollers are preferably made of perforated or other foraminous metal, thereby forming a foraminous septum. The metal should be very thin and provided with a multiplicity of minute perforations G spaced very close together, as shown by the dots and dashes on the cylinder in Fig. 2 which indicate perforations.

Dried and heated compressed air is preferably led into the interior of the revolving cylinders D, through the hollow bearings C at one side and the air is forced out through the perforations of the surfaces of the cylinders.

A hopper I is provided underneath the revolving cylinders and suction as from a fan may be applied to the aperture J of said hopper, and also to the aperture K of the upper hood E. Suitable knives or scrapers L are provided for scraping the material from the cylinders, and chutes O communicate with the sides of the cylinders and extend downwardly to the boxes P provided with gauze covers Q to permit the exit of air induced by suction applied to the boxes P.

Any suitable air pump R may be used for forcing air into the storage tank S, and the air may be dried in the drying chamber T before passing to the pump, or dried after passing the pump. From the storage tank S the air passes through any suitable heating apparatus, as for instance the coil U in the chamber V, which may be heated in any suitable manner. From thence the heated and dried air is forced through the pipes H into the cylinders.

In the operation of the process as carried out by the apparatus described and shown, the material to be desiccated or dried, which may be whole milk, skim milk, mixtures of milk and other food stuffs, or other like material, is fed on the upper descending quadrants of the two foraminous cylinders or drums which are revolving substantially or nearly in contact. Air is supplied to the interior of the drums under such pressure and in such volume as not only to counterbalance and obviate the tendency of the material to enter through the perforations but as to pass outward through the perforations and through and past the material on the drums. With the apparatus shown, the air bubbles through the material on the upper descending quadrants of the drum and the bubbles persisting in the concentrated material are flattened out, to enable the formation of a film, at the point where the drums rotate in contact or near contact. Below this point, on the lower descending and ascending quadrants, the film of concentrated and more or less viscous material is blown outwards and desiccated by the air passing through the perforations to form filaments or tufts which, so far as they adhere to the drums are shaved off by the scrapers shown. The duplication of the foraminous drums is a convenient way of securing the formation of a compact and suitable film from the partially evaporated material. In starting the apparatus shown, the air under pressure is first passed into the drums before beginning the feed of the liquid. The desiccated filaments or tufts are constantly removed from the drums by knives or scrapers L and fall through chutes O into collecting boxes P.

Any suitable temperature for the air may be employed suitable for the particular material to be dried. The water vapor and air escaping through the cylinders is suitably sucked away through the hood E and hopper I. The suction apertures may be properly screened not shown to prevent any of the product from passing through.

Milk as it is delivered from the dairies and farmers has a varying acidity, and preferably the acidity of all the milk to be dried is rendered alike by neutralizing the excessive acidity with a suitable alkali or alkaline salt. By so doing the dry milk is of uniform quality and does not differ in its acidity so that even better results are obtained than from fresh milk. The milk may be pasteurized or sterilized before subjecting it to the drying process, or may even be concentrated and some of its water thus expelled.

The speed of the revolving cylinders should be so regulated that the film is dried when it reaches the scrapers, and the thickness of the film can be regulated by adjusting the distance apart of the cylinders. The force of the current of air, its dryness and its temperature may be regulated in any desired manner to dry quickly or slowly. If the material to be dried is of a delicate nature and sensitive to heat, it may be dried without changing its nature or its composition, so that when sufficient water is added to the resulting dry powder the original solution is regained.

This simple and very efficient mode of drying, when applied to milk yields a powder which contains the milk solids in an unchanged state, and when water is added to the powder, it is restored to milk with all its constituent parts intact. The powder is stable and can be stored for future use in all climates. It retains its nutrient quality and furnishes a valuable product, since milk for instance in its natural state can only be kept at the very best for several days, while the dry powder can be kept for years if not damaged by water or otherwise.

I claim and desire to obtain by Letters Patent the following:

1. The process of drying liquid material which comprises passing air under pressure through a traveling perforated carrier and through a layer of liquid material to be dried adhering thereto, continuously supplying liquid material to be dried to an anterior portion of said traveling surface as an adhering layer and removing the porous dried material from a posterior portion.

2. The process of drying milk which comprises passing air under pressure through a traveling perforated carrier and through a layer of milk to be dried adhering thereto, continuously supplying milk to be dried to an anterior portion of said traveling surface as an adhering layer and removing the porous dried milk from a posterior portion.

3. The process of drying liquid material which comprises passing air under pressure through a traveling perforated carrier and through a layer of liquid material to be dried adhering thereto, continuously supplying liquid material to be dried to an anterior portion of said traveling surface as an adhering layer and pressing it into a film on said surface after partial evaporation, and removing the porous dried material from a posterior portion.

4. The process of drying milk which comprises passing air under pressure through a traveling perforated carrier and through a layer of milk to be dried adhering thereto, continuously supplying milk to be dried to an anterior portion of said traveling surface as an adhering layer and pressing it into a film on said surface after partial evaporation, and removing the porous dried milk from a posterior portion.

5. The process of drying liquid materials which comprises supplying air under pressure to the interior of a rotating perforated drum and through a layer of material adhering to the exterior thereof, continuously supplying liquid material to the surface of said perforated drum and removing dried material at a point posterior to the point of supply of liquid material.

6. The process of drying milk which comprises supplying air under pressure to the interior of a rotating perforated drum and through a layer of milk adhering to the exterior thereof, continuously supplying milk to the surface of said perforated drum and removing dried milk at a point posterior to the point of supply of milk.

7. The process of drying liquid material which comprises supplying air under pressure to the interior of a rotating perforated drum and through a layer of material adhering to the exterior thereof, continuously supplying liquid material to the surface of said perforated drum and pressing the material into a layer after partial evaporation thereon and removing the dried material at a point posterior to the point of supply of liquid material.

8. The process of drying milk which comprises supplying air under pressure to the interior of a rotating perforated drum and through a layer of milk adhering to the exterior thereof, continuously supplying milk to the surface of said perforated drum and pressing the milk into a layer after partial evaporation thereon and removing the dried milk at a point posterior to the point of supply of milk.

9. The process of desiccating milk into a filamentous product which comprises continuously supplying milk to an anterior portion of a traveling perforated carrier having heated and dried air passing outward through the perforations thereof, after a period of travel with said surface and partial desiccation thereon pressing down the partially evaporated milk into a layer, in subsequent travel disintegrating the layer and completing the desiccation by outward passing air and finally removing the filamentous or tufted product formed from a posterior portion of such traveling surface.

10. The process of desiccating milk into a filamentous product which comprises continuously supplying milk to anterior portions of a pair of rotating perforated drums interiorly supplied with heated and dried air under pressure and rotating in close proximity, after a period of travel with said rotating drums pressing the partially evaporated milk into a layer between the drums, in subsequent travel disintegrating the layer and completing the desiccation by outward passing air; and finally removing the filamentous or tufted product formed from posterior portions of such rotating drums.

11. The process of desiccating milk into a filamentous product which comprises continuously supplying neutralized milk to an anterior portion of a traveling perforated carrier having heated and dried air passing outward through the perforations thereof, after a period of travel with said surface and partial desiccation thereon pressing down the partially evaporated milk into a layer, in subsequent travel disintegrating the layer and completing the desiccation by outward passing air and finally removing the filamentous or tufted product formed from a posterior portion of such traveling surface.

12. The process of desiccating milk into a filamentous product which comprises continuously supplying neutralized milk to anterior portions of a pair of rotating perforated drums interiorly supplied with heated and dried air under pressure and rotating in close proximity, after a period of travel with said rotating drums pressing the partially evaporated milk into a layer between the drums, in subsequent travel disintegrating the layer and completing the desiccation by outward passing air, and finally removing the filamentous or tufted product formed from posterior portions of such rotating drums.

In testimony whereof I have signed this specification in the presence of two subscribing witnesses.

JOHN A. JUST.

Witnesses:
 OLIN A. FOSTER,
 A. L. O'BRIEN.